US012606331B2

(12) United States Patent
Brown

(10) Patent No.: US 12,606,331 B2
(45) Date of Patent: Apr. 21, 2026

(54) PAINT SAMPLE PACKET-MAKING APPARATUS

(71) Applicant: The Paint'n Packet, LLC, Fort Myers, FL (US)

(72) Inventor: David Brown, Fort Myers, FL (US)

(73) Assignee: The Paint'n Packet, LLC, Fort Myers, FL (US)

( * ) Notice: Subject to any disclaimer, the term of this patent is extended or adjusted under 35 U.S.C. 154(b) by 0 days.

(21) Appl. No.: 18/796,889

(22) Filed: Aug. 7, 2024

(65) Prior Publication Data

US 2026/0042556 A1 Feb. 12, 2026

(51) Int. Cl.

| | |
|---|---|
| ***B65B 3/26*** | (2006.01) |
| ***B01F 33/84*** | (2022.01) |
| ***B01F 35/10*** | (2022.01) |
| ***B01F 101/30*** | (2022.01) |
| ***B65B 3/04*** | (2006.01) |
| ***B65B 51/10*** | (2006.01) |

(52) U.S. Cl.

CPC .............. *B65B 3/26* (2013.01); *B01F 33/844* (2022.01); *B01F 35/145* (2022.01); *B65B 3/04* (2013.01); *B65B 51/10* (2013.01); *B01F 2101/30* (2022.01)

(58) Field of Classification Search

CPC ... B65B 3/26; B65B 3/04; B65B 51/10; B01F 35/145; B01F 33/844; B01F 2101/30

USPC ........................................................... 53/428

See application file for complete search history.

(56) References Cited

U.S. PATENT DOCUMENTS 3,670,785 A * 6/1972 Heiss ...................... B01F 33/84 141/90
3,878,907 A * 4/1975 Morick ............... B01F 35/2117 222/168.5
4,997,416 A * 3/1991 Mitchell ........... B29C 66/73116 493/341
5,468,068 A * 11/1995 Hotchkiss, III .......... B44D 3/06 366/349
5,622,283 A * 4/1997 Morrison ................ B05C 17/00 222/103
5,887,975 A * 3/1999 Mordaunt ............... B01F 35/21 366/182.1
6,250,344 B1 * 6/2001 Gerritse ................ B01F 35/881 141/83
8,936,390 B2 * 1/2015 Hughes ..................... B08B 3/02 366/605
9,211,514 B2 * 12/2015 Hughes ................. B01F 23/405
2004/0122553 A1 * 6/2004 Phan ....................... G07F 11/70 700/233
2005/0082197 A1 * 4/2005 Carol ..................... B65D 27/04 206/81
2006/0011259 A1 * 1/2006 Parekh .................... B01F 33/84 141/83

(Continued)

*Primary Examiner* — Dariush Seif

(74) *Attorney, Agent, or Firm* — Renner, Otto, Boisselle & Sklar, LLP

(57) ABSTRACT

A paint packet-making apparatus may include a plurality of containers configured to contain one or more base paints and one or more tints, a sachet packaging apparatus, and a precision dispenser configured to work in concert with the sachet packaging apparatus and fluidly connected to the plurality of containers to selectively dispense the one or more base paints and the one or more tints into respective sachets to produce at least one custom paint sample with a volume of 125 mL or less.

20 Claims, 5 Drawing Sheets

(56) References Cited

U.S. PATENT DOCUMENTS

2007/0253280 A1* 11/2007 Orben ................. B01F 33/8442 366/160.5
2008/0051936 A1* 2/2008 Lindblom ........... B01F 35/7137 700/239
2008/0195250 A1* 8/2008 Post ....................... G01G 13/16 702/41
2009/0139605 A1* 6/2009 Bellens ................... G07F 13/10 141/313
2009/0228143 A1* 9/2009 Hughes ................. B01F 33/846 700/239
2009/0248199 A1* 10/2009 Milhorn ................. G06Q 20/20 705/16
2011/0101028 A1* 5/2011 Chassaing ......... B01F 35/71745 222/144.5
2011/0290152 A1* 12/2011 Gebhard .................. C09D 7/41 106/411
2012/0285582 A1* 11/2012 Airaksinen ............. B01F 33/84 141/100
2013/0032244 A1* 2/2013 Boboltz ................ B01F 33/846 141/83
2013/0111849 A1* 5/2013 Bush ....................... B65B 65/00 53/167
2013/0146483 A1* 6/2013 Carol ................. G06Q 30/0225 206/81
2015/0124553 A1* 5/2015 Hughes ................... B01F 35/13 366/138
2016/0144326 A1* 5/2016 Boboltz .......... B01F 35/717613 222/136
2018/0117549 A1* 5/2018 Rossetti .................. G07F 13/06
2018/0117550 A1* 5/2018 Charles ..................... G01J 3/50
2018/0296995 A1* 10/2018 Kinnen .................. G06Q 20/18
2019/0030502 A1* 1/2019 Ellsworth ............ C09D 167/08
2020/0037742 A1* 2/2020 Palmer .................... B65B 61/26
2022/0062838 A1* 3/2022 Lori .................... B01F 35/2117
2023/0069971 A1* 3/2023 Sacchet ............. B01F 35/71775
2024/0198304 A1* 6/2024 Shen ......................... B08B 1/12
2024/0226834 A1* 7/2024 Nungesser ............... C08K 9/10

* cited by examiner

PAINT SAMPLE PACKET-MAKING APPARATUS

FIELD OF THE INVENTION

The present invention relates generally to the field of paint tinting systems, and more particularly to paint sample-making apparatuses.

BACKGROUND

Conventionally, paint samples can generally be purchased as either painted cards or as pint-size sample tubs of paint. Usually, painted cards are arranged on shelving displays in a store, and take up a significant area of floor space, or "footprint." Further, the display needs to be consistently maintained, stocked, and organized. Small sample tubs of paint are a common small size of paint sample that can be purchased at a store. To sell sample tubs, tubs of the base paint with the chosen finish and tint (matte finish, eggshell finish, gloss finish, or semi-gloss finish, and light base, medium base, and dark base, for example) must be stored, inventoried, and maintained as needed at the store. Like the paint card displays, these sample tubs can also take up a significant amount of floor space or footprint. Commonly, paint tinting apparatuses are only able to produce paint samples which have a volume of about 1 US pint (approx. 473 mL) or greater. Often, certain tinting apparatuses are not able to make certain colors of paint samples due to the lack of accuracy of the paint mixing device.

Customers who purchase paint samples to try for their project must generally purchase a whole pint or quart (approx. 946 mL) at a time, which is often much more than the customer would expect to use to sample the paint color. Consequently, the leftover paint often gets wasted, discarded, or stored at the user's project site or home.

SUMMARY

The present disclosure provides a paint packet-making assembly for making custom paint samples. The present disclosure also provides a method for making custom paint samples. The paint packet-making apparatus may include a plurality of containers configured to contain one or more base paints and one or more tints, a packaging apparatus, and a precision dispenser configured to work in concert with the packaging apparatus and fluidly connected to the plurality of containers to selectively dispense the one or more base paints and the one or more tints into respective sachets or other containers to produce at least one custom paint sample with a volume of 125 mL or less.

The paint packet-making apparatus may include a paint mixer, tubing coupling the paint mixer to one or more base paints and one or more tints, and a precision dispenser that selectively dispenses the one or more base paints and the one or more tints.

Using the paint packet-making apparatus and method, a user can select a small (125 mL or less) custom paint sample. The assembly can mix the custom paint sample by precision titration of tints and base paints into a precision mixer. The precision mixer can then feed the custom sample into a sachet, such as into a flexible sealed plastic sachet, similar to a typical packet for a salad dressing or ketchup, conveniently packaging the paint sample for the user. In another embodiment, the apparatus can deliver precise amounts of the one or more base paints and/or the one or more tints by precision titration into a sachet. The user can then mix the one or more base paints and/or the one or more tints delivered to the sachet using her fingers. In one embodiment, instead of a sachet, some other kind of small container (125 mL or less) may be used.

Because the apparatus can self-clean its mixer and other relevant features, the apparatus can produce different shades and finishes of custom paint within a single apparatus. This flexibility enables a user to retrieve various colors and finishes of custom paint samples from the apparatus to apply, for example, on a user's painting project. The relatively small samples can encourage users to try multiple paint samples without excessively acquiring pint or quart-size paint samples that will likely be wasted.

A further benefit to the paint packet-making apparatus can be especially experienced by paint stores, hardware stores, design studios, and other suppliers or businesses. The apparatus requires a significantly smaller amount of floor space and inventory than conventional paint sampling displays and paint sample storage racks. Instead of the need to maintain inventory of racks of pint or quart-size paint cans or jugs for sampling, the store or business would only need to ensure that the apparatus was properly filled or supplied with a relevant amount of base paints and tints to fit within the apparatus. Further, the store could use the apparatus as a replacement for the large footprint display of paint cards.

The paint packet-making apparatus can produce small samples, up to 125 mL, but also including volumes such as 50 mL and 100 mL, depending on the selection by the user. The relatively small size of the custom paint samples prevents environmental waste of paint chemicals as well as the inconvenience to both the consumer and to the community associated with discarding unused paint.

The present disclosure provides that a paint packet-making apparatus includes a paint mixer, tubing coupling the paint mixer to one or more base paints and one or more tints, and a precision dispenser that dispenses selective of the one or more base paints and the one or more tints into the mixer. The paint packet-making apparatus produces a custom paint sample with a volume of 125 mL or less.

A paint packet-making apparatus includes: a paint mixer; tubing coupling the paint mixer to one or more base paints and one or more tints; and a precision dispenser that dispenses selective of the one or more base paints and the one or more tints into the paint mixer. The paint packet-making apparatus produces a custom paint sample with a volume of 125 mL or less.

The one or more tints may include at least ten tints.

The paint packet-making apparatus may include: a nozzle coupled to the mixer. The nozzle may be configured to insert the custom paint sample into a sachet.

The paint packet-making apparatus may include a controller coupled to the precision dispenser. The controller may be configured to control a tint volume of the one or more tints and a base paint volume of the one or more base paints to be inserted into the mixer via the precision dispenser.

The paint packet-making apparatus may include a sealer for sealing one or more edges of a sachet material to make a sachet.

The paint packet-making apparatus may include a support for holding a supply of the sachet material.

The precision dispenser may be coupled to a motor which rotates an auger within the precision dispenser; and rotation of the auger may dispense the tint volume or base paint volume.

The precision dispenser may include a user interface on which a user can select a chosen paint color.

The paint packet-making apparatus may produce the chosen paint color based on a selection by the user on the user interface.

The paint packet-making apparatus may include a user interface on which a user can select a chosen paint sample volume.

The paint packet-making apparatus may produce the chosen paint sample volume based on a selection by the user on the user interface.

A method of making a sachet of a custom paint sample includes: selectively adding one or more tints to the sachet; and selectively adding a base paint to the sachet such that the custom paint sample having a volume of 125 mL or less is contained within the sachet.

The method may include sealing the sachet containing the custom paint sample.

The method may include cleaning a nozzle which feeds the one or more tints to the sachet.

The method may include selecting a chosen paint color using a user interface.

The method may include sealing one or more edges of a sachet cover material to produce an unsealed sachet.

The method may include selecting a chosen paint finish using a user interface.

The method may include selecting a chosen paint sample size using a user interface.

The method may include mixing the paint sample using a precision mixer.

The method may include cleaning the precision mixer.

The foregoing and other features of the paint packet-making apparatus and method are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

DETAILED DESCRIPTION

A paint packet-making apparatus of the present disclosure can provide for convenient production of custom small-volume colored paint samples, such as samples up to 125 mL. The paint packet-making apparatus can produce a wide variety of colors via precision injection of chosen paint tints with a chosen base paint. The paint packet-making apparatus can house multiple base paints, such as a dark base and a light base, and/or bases with different sheens, such as satin, matte, eggshell, gloss, or semi-gloss. The paint packet-making apparatus can conveniently house a roll or sheet of sachet cover material which can be sealed and cut by the machine after insertion of the custom paint sample into a sachet of the sachet cover material. The components of the paint packet-making apparatus can be housed within a housing, for example, for convenient installation into a hardware store or paint store.

Figure 1:
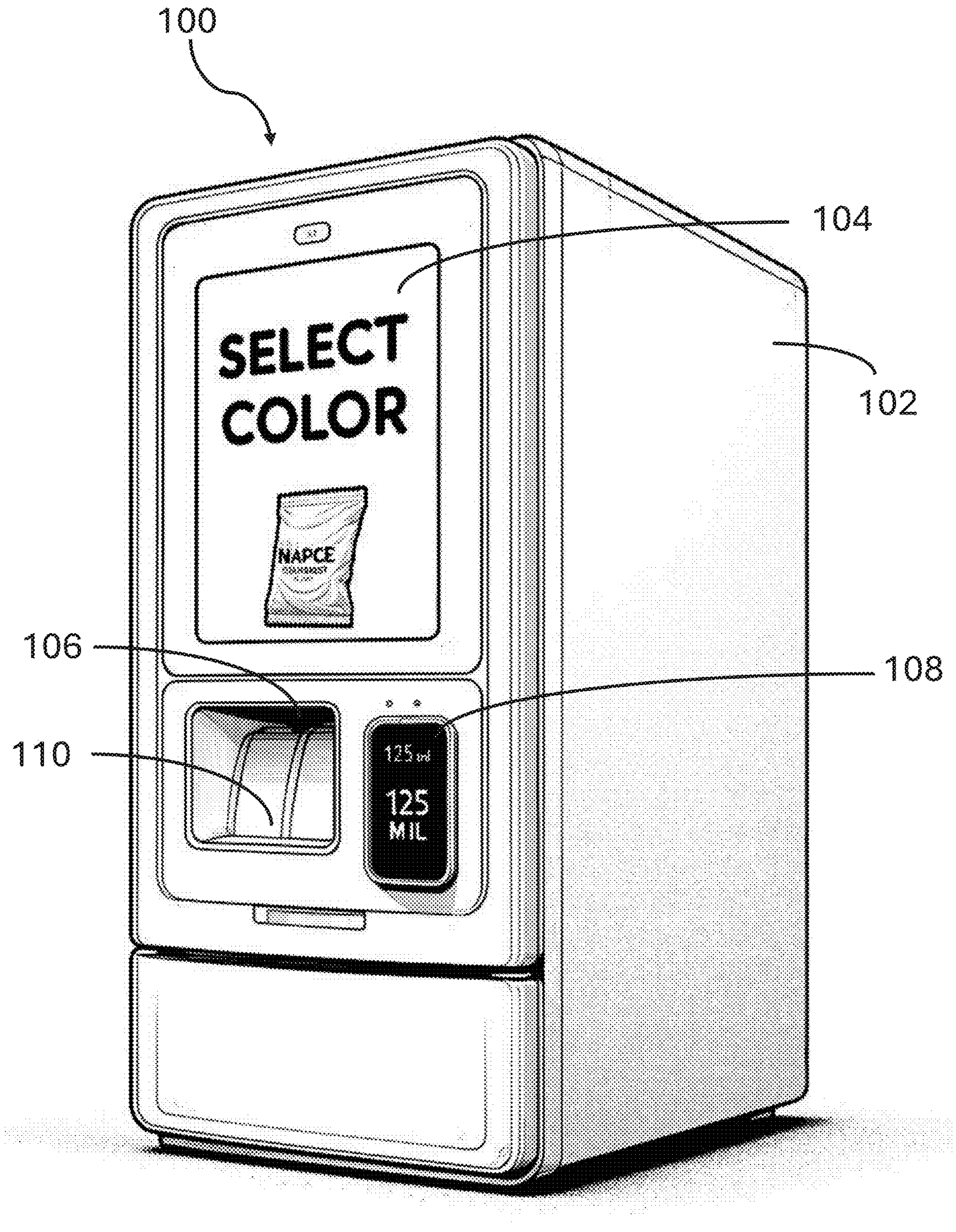
FIG. 1 is a front view of an exemplary paint packet-making apparatus.

Turning now to FIG. 1, a paint packet-making apparatus (or "apparatus") 100 is shown. The apparatus 100 may include a housing 102 containing the internal components of the apparatus. The exterior of the housing 102 can include a user interface 104, a payment processor 108, a scanner 106, and a dispensing opening 110. A user can touch the user interface 104 to select a custom paint color to be delivered by the apparatus 100 and dispensed via the dispensing opening 110. Alternatively or additionally, the user can scan a bar code, such as a bar code included on the back of a paper paint color sample or catalog, using the scanner 106. The scanning of the bar code can communicate to the apparatus 100 to dispense the chosen paint color through the dispensing opening 110.

The process begins with the user selecting the desired color and amount of paint sample via the user interface 104, which could be a touchscreen or a mobile application connected to the apparatus. The user can choose from a wide range of tints and base paints available in the system's database. Once the selection is made, the apparatus 100 initiates the mixing process.

Figure 2:
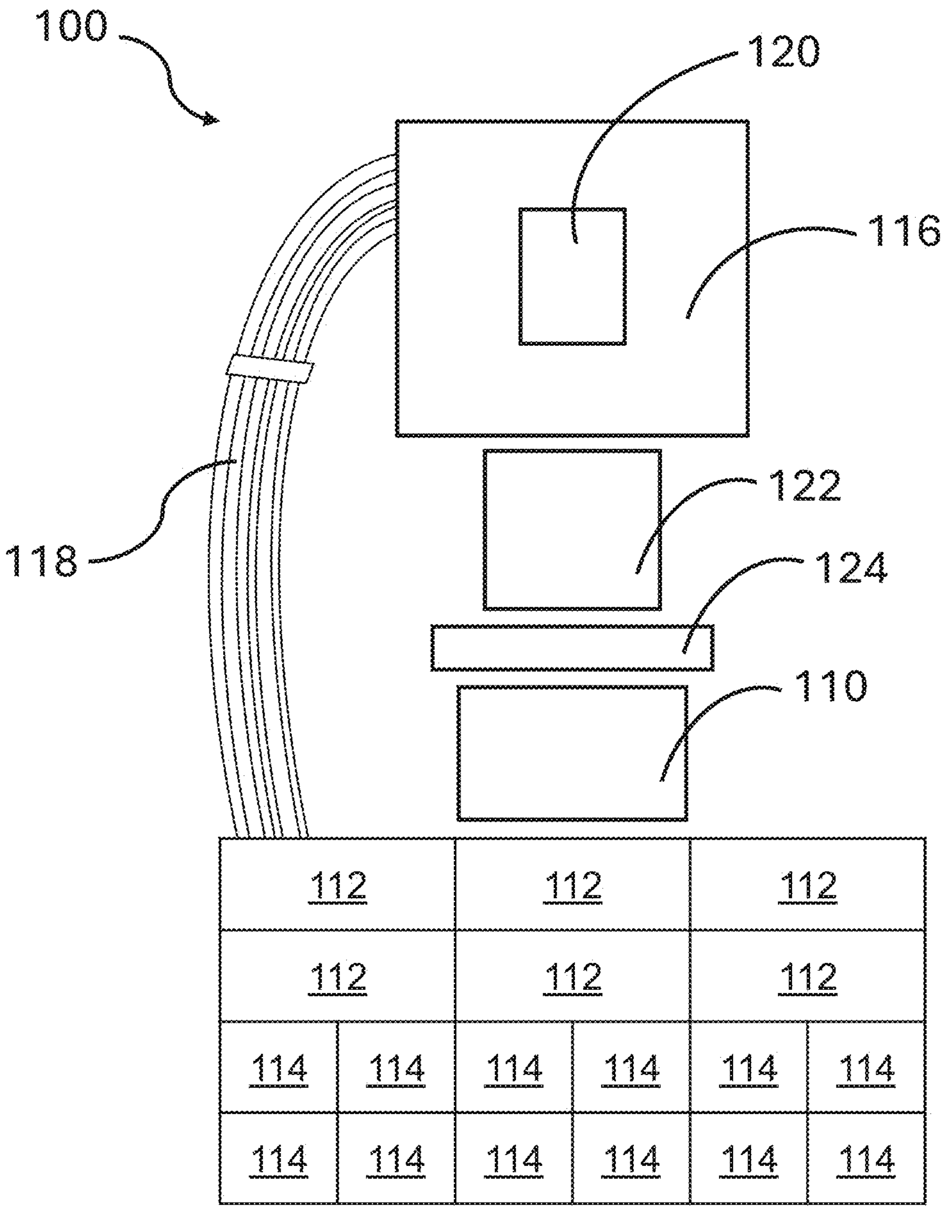
FIG. 2 is a front view of the interior of an exemplary paint packet-making apparatus.

Turning next to FIG. 2, the interior of the apparatus 100 is shown. The apparatus 100 includes one or more base paint containers 112 and multiple tint containers 114 that can be coupled to a mixing chamber 116 via tubing 118. Between the tubing 118 and the mixing chamber 116 are precision titration valves individually coupled to the tubes corresponding to each respective base or tint. The precision titration system accurately measures and dispenses precise amounts of the selected tints and base paints to ensure that the proportions of each color component are exact, resulting in a consistent and accurate color match to the user's specifications. The precision titration valves are described in further detail below. Turning back to FIG. 2, within the mixing chamber 116 is a precision mixing head 120 which can mix very small volumes of tints and base paints to produce the selected custom shade of paint.

A sachet packaging apparatus 122, which may include a packaging roll feeder, may be disposed beneath the mixing chamber 116 so that an open sachet can be fed into an appropriate location to accept the custom paint sample. The paint sample that was mixed via the precision mixing head 120 can be injected into the open sachet or the paint may be injected directly into the sachet and mixed later. The open sachet containing the paint sample can then be sealed, cut, and labeled by the packaging cutter and printer 124. The sealed paint sample sachet can then be delivered to the user or customer via the dispensing opening 110.

In one embodiment, mixing of the custom paint sample may take place in the sachet after delivery. Using the user interface 104, the user can select a color for a small (125 mL or less) custom paint sample. The precision titration valves can deliver precise amounts of the one or more base paints and/or the one or more tints by precision titration into a sachet. Once the sachet is filled and sealed, the sachet may be delivered to the user via the dispensing opening 110. The user can then mix the one or more base paints and/or the one or more tints delivered in the sachet using her fingers. The sachet design allows for easy manipulation and mixing of the contents without the need for additional tools.

In yet another embodiment, instead of using a sachet, the apparatus can package the paint sample in some other kind of small container (125 mL or less). This container could be a small plastic jar, a vial, or any other suitable packaging that ensures the paint sample is well-preserved and easy to use. The choice of container can be tailored to the user's preference or the specific requirements of the paint sample.

Figure 3:
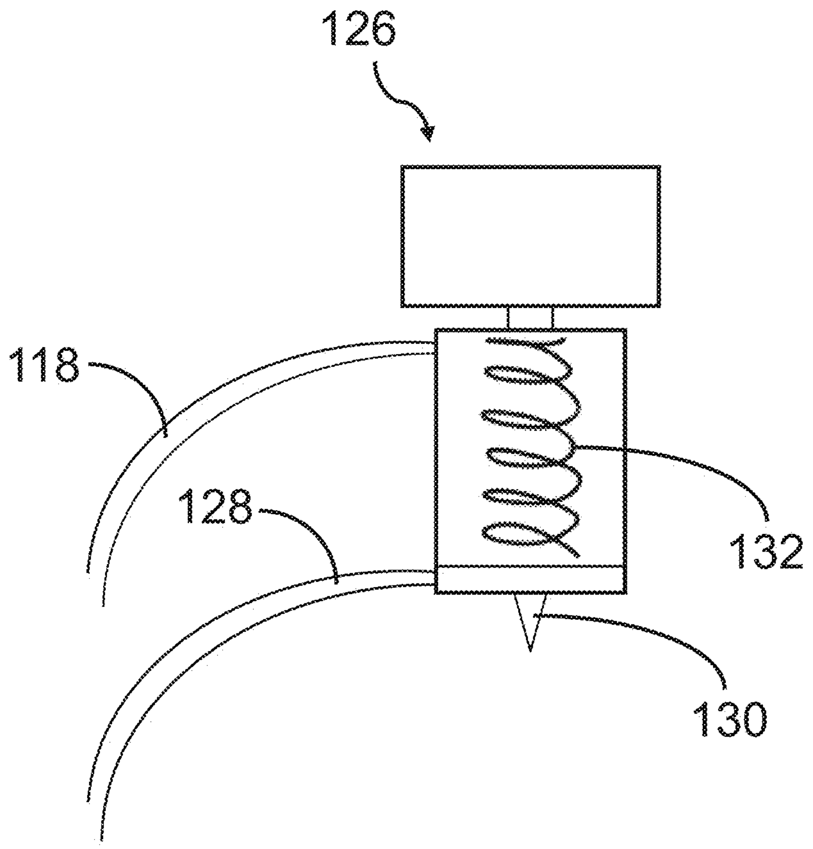
FIG. 3 is a precision dispenser of the paint packet-making apparatus.

A precision titration valve 126 is shown in FIG. 3. An example of a precision titration valve which may be used is an AirFree® dispensing tip by Fishman Corporation, which can dispense volumes of fluid between approximately 0.00003 mL and 1.81 mL. The titration valve 126 can be coupled to the tubing 118 for a particular tint container 114 or for a particular base paint container 112. The titration valve feeds small amounts of tint or base paint (such as an amount of tint between 0.01 mL and 0.06 mL) into the mixing chamber 116 via the injection head 130. For example, to produce a paint sample, the paint sample may include a base paint volume of approximately 45 mL with a total tint volume of approximately 0.029 mL. Another approximately 45 mL custom paint sample may include a base paint with a volume of approximately 45 mL with a total tint volume of approximately 0.017 mL. The respective tint volumes may include one or more base tints, such as one of or two or more of any combination of blue, magenta, red, yellow, black, or any other suitable tint color. The titration valve 128 can include a return line 128 for returning unused tint or base paint to the tubing 118 and/or to the base paint containers 112 or tint containers 114. The precision titration valve 126 can include an auger 132 coupled to a servo motor (not shown). The servo motor can rotate the auger 132 within the precision valve 126 a specific number of degrees and/or a specific number of rotations such that a corresponding chosen amount of base paint or base tint is dispensed through the injection head 130.

Figure 4:
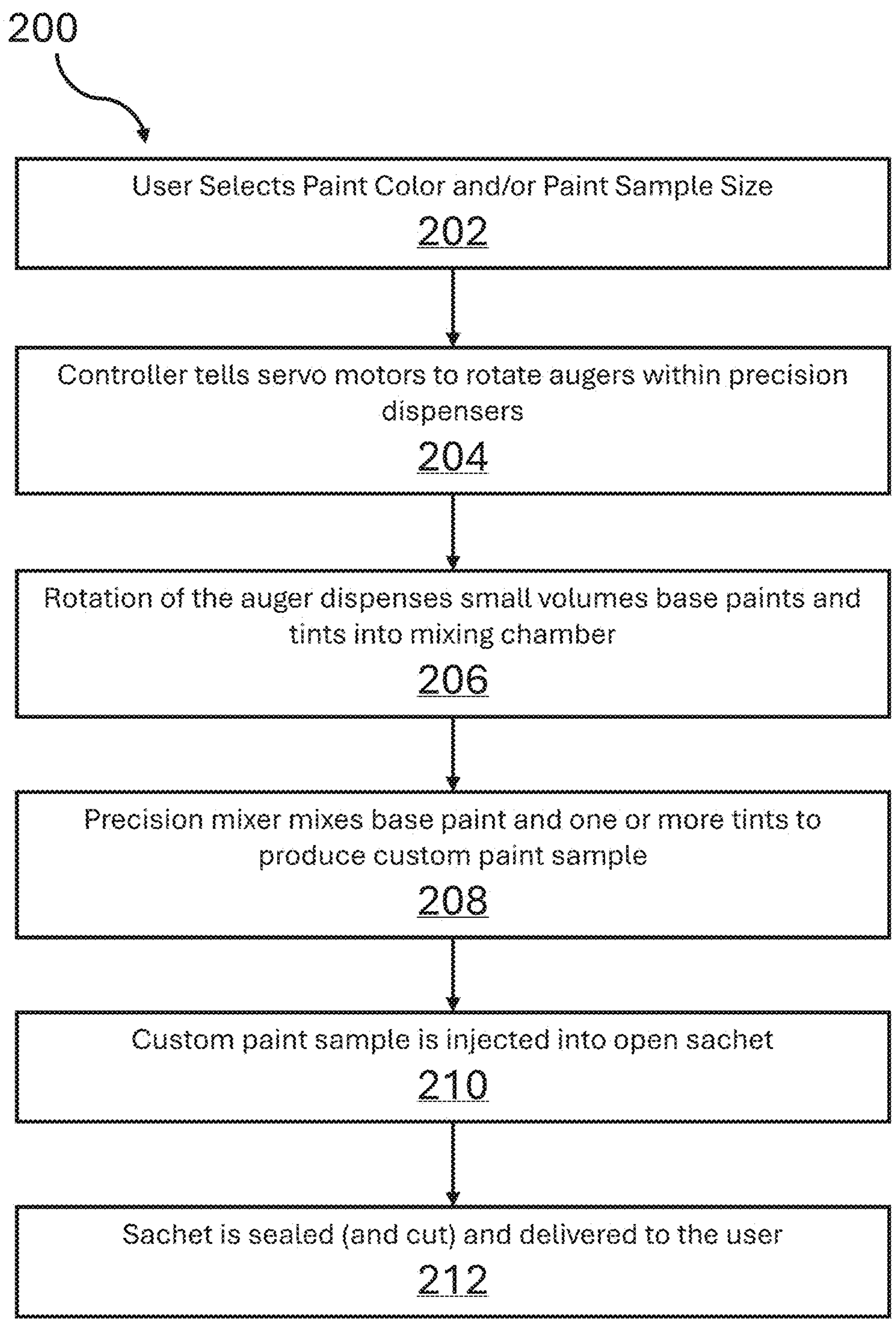
FIG. 4 is a flow chart of a method of making a custom paint sachet.

FIG. 4 is a flow chart illustrating a method 200 of making a custom paint sample using the paint packet-making apparatus 100 (FIG. 1). At 202, a user selects a paint color, paint finish, and/or a paint sample size to be packaged by the apparatus 100. The selection can be made via the user interface 104 (FIG. 1), which may be a touch screen or a screen with corresponding buttons. Alternatively or additionally, the user selections may be made via scanning a barcode, a QR code, or a color (via color-matching technology, for example), using a scanner 106 (FIG. 1) incorporated into the housing 102 (FIG. 1) of the apparatus 100.

Next, at 204, one or more controllers within the apparatus 100 communicate with servo motors coupled to augers 132 (FIG. 3) within precision dispensers. The precision dispensers can be, for example, precision titration valves 126 (FIG. 3). The controllers will instruct the augers 132 to rotate a certain number of rotations or a certain fraction of a rotation in order to dispense a particular precise volume of base paint or tint. The precise volume of base paint or tint corresponds to the amount required to produce a particular color of custom paint sample. At 206, the precision dispensers release the base paint and tint into a mixing chamber.

In one embodiment, in the mixing chamber, at 208, the precision mixer 120 (FIG. 2) mixes the base paint and one or more tints to produce the custom paint sample. The custom paint sample is then injected into an open sachet at 210. After injection of the custom paint sample into the open sachet, at 212, the sachet is sealed (and cut, if necessary), and delivered to the user via a dispensing opening 110 (FIG. 2). The process can also include a cleaning step in which the apparatus 100 (FIG. 2) self-cleans the mixing chamber 116 (FIG. 2), the precision mixer 120 (FIG. 2), and/or any other feature of the apparatus 100 which, if contaminated, could affect the quality and/or color of subsequently produced custom paint samples.

Figure 5:
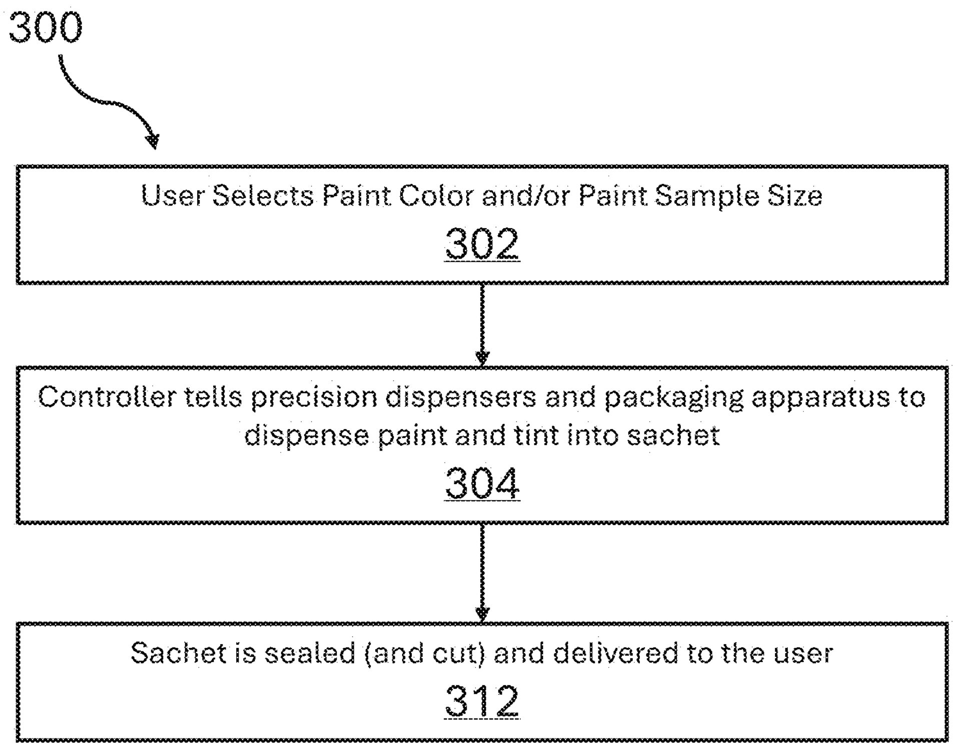
FIG. 5 is a flow chart of an alternative method of making a custom paint sachet.

FIG. 5 is a flow chart illustrating an alternative method 300 of making a custom paint sample using the paint packet-making apparatus 100 (FIG. 1). At 302, a user selects a paint color, paint finish, and/or a paint sample size to be packaged by the apparatus 100. The selection can be made via the user interface 104 (FIG. 1), which may be a touch screen or a screen with corresponding buttons. Alternatively or additionally, the user selections may be made via scanning a barcode, a QR code, or a color (via color-matching technology, for example), using a scanner 106 (FIG. 1) incorporated into the housing 102 (FIG. 1) of the apparatus 100.

Next, at 304, the one or more controllers may instruct the one or more precision dispensers to work in concert with the packaging apparatus in order to dispense a particular precise volume of base paint and tint to produce a particular color of custom paint sample into a sachet. In an alternative method, the precision dispenser releases or injects the base paint and/or tint into a container different from a sachet. After injection of the custom paint sample into the open sachet or other container, at 312, the sachet is sealed (and cut, if necessary), and delivered to the user via a dispensing opening 110 (FIG. 2). The user may then mix the paint user her fingers.

The process can also include a cleaning step in which the apparatus 100 (FIG. 2) self-cleans the mixing chamber 116 (FIG. 2), the precision mixer 120 (FIG. 2), and/or any other feature of the apparatus 100 which, if contaminated, could affect the quality and/or color of subsequently produced custom paint samples.

The paint packet-making apparatus 100 (FIG. 1) delivers one or more base paints and one or more tints via a precision dispenser 126 (FIG. 3) that dispenses selective of the one or more base paints and the one or more tints into a paint mixer 120 or directly to sachets or other containers. The paint packet-making apparatus 100 produces a custom paint sample with a volume of 125 mL or less.

All features disclosed herein, including the claims, abstract, and drawings, and all the steps in any method or process disclosed, may be combined in any combination, except combinations where at least some of such features and/or steps are mutually exclusive. Each feature disclosed herein, including the claims, abstract, and drawings, can be replaced by alternative features serving the same, equivalent, or similar purpose, unless expressly stated otherwise.

Although the invention defined by the following claims has been shown and described with respect to a certain embodiment, equivalent alternations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

I claim:

1. A paint packet-making apparatus comprising:
a plurality of containers configured to contain one or more base paints and one or more tints;
a packaging apparatus; and
a precision dispenser configured to work in concert with the packaging apparatus and fluidly connected to the plurality of containers to selectively dispense the one or more base paints and the one or more tints into respective packages to produce at least one custom paint sample with a volume of 125 mL or less.

2. The paint packet-making apparatus according to claim 1, the precision dispenser comprising:
a paint mixer;
one or more fluid paths coupling the paint mixer to the one or more base paints and the one or more tints for the precision dispenser to selectively dispense the one or more base paints and the one or more tints into the paint mixer, the mixer configured to mix the one or more base paints and the one or more tints into the custom paint sample.

3. The paint packet-making apparatus according to claim 2, further comprising a nozzle coupled to the mixer;
wherein the nozzle is configured to insert the custom paint sample into a sachet.

4. The paint packet-making apparatus according to claim 1, further comprising a controller coupled to the precision dispenser;
wherein the controller is configured to control a tint volume of the one or more tints and a base paint volume of the one or more base paints to be supplied to the precision dispenser.

5. The paint packet-making apparatus according to claim 1, further comprising a sealer for sealing one or more edges of a sachet material to make a sachet.

6. The paint packet-making apparatus according to claim 5, further comprising a support for holding a supply of the sachet material.

7. The paint packet-making apparatus according to claim 1:
wherein the precision dispenser is coupled to a motor which rotates an auger within the precision dispenser; and
wherein rotation of the auger dispenses the tint volume or base paint volume.

8. The paint packet-making apparatus according to claim 1, further comprising a user interface on which a user can select a chosen paint color.

9. The paint packet-making apparatus according to claim 8, wherein the paint packet-making apparatus is configured to produce the chosen paint color based on a selection by the user on the user interface.

10. The paint packet-making apparatus according to claim 1, further comprising a user interface on which a user can select a chosen paint sample volume.

11. The paint packet-making apparatus according to claim 10, wherein the paint packet-making apparatus is configured to produce the chosen paint sample volume based on a selection by the user on the user interface.

12. A method of making a sachet of a custom paint sample comprising:
selectively adding one or more tints to the sachet;
selectively adding a base paint to the sachet such that the custom paint sample having a volume of 125 mL or less is contained within the sachet.

13. The method according to claim 12, further comprising sealing the sachet containing the custom paint sample.

14. The method according to claim 12, further comprising cleaning a nozzle configured to feed the one or more tints to the sachet.

15. The method according to claim 12, further comprising selecting a chosen paint color using a user interface.

16. The method according to claim 12, further comprising sealing one or more edges of a sachet cover material to produce an unsealed sachet.

17. The method according to claim 12, further comprising selecting a chosen paint finish using a user interface.

18. The method according to claim 12, further comprising selecting a chosen paint sample size using a user interface.

19. The method according to claim 12, further comprising mixing the paint sample using a precision mixer.

20. The method according to claim 12, further comprising cleaning the precision mixer.

* * * * *